United States Patent
Chujo

(10) Patent No.: US 9,471,446 B2
(45) Date of Patent: Oct. 18, 2016

(54) SYSTEM AND METHOD FOR SAVING DATA STORED IN A CACHE MEMORY AS AN INVISIBLE FILE

(71) Applicant: FUJITSU LIMITED, Kawasaki-shi, Kanagawa (JP)

(72) Inventor: Yoshihisa Chujo, Seto (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/507,185

(22) Filed: Oct. 6, 2014

(65) Prior Publication Data

US 2015/0106650 A1    Apr. 16, 2015

(51) Int. Cl.
*G06F 11/16* (2006.01)
*G06F 11/20* (2006.01)
*G06F 11/14* (2006.01)

(52) U.S. Cl.
CPC ....... *G06F 11/2028* (2013.01); *G06F 11/1469* (2013.01); *G06F 11/1658* (2013.01); *G06F 11/2058* (2013.01); *G06F 11/16* (2013.01); *G06F 2201/84* (2013.01); *G06F 2201/85* (2013.01)

(58) Field of Classification Search
CPC ........... G06F 11/1612; G06F 11/1658; G06F 11/1662; G06F 2211/1007; G06F 2211/1009; G06F 2211/1028; Y10S 707/99951; Y10S 707/99955

See application file for complete search history.

(56) References Cited

U.S. PATENT DOCUMENTS

| | | | | |
|---|---|---|---|---|
| 2005/0182906 A1* | 8/2005 | Chatterjee | ............. | G06F 11/201 711/144 |
| 2009/0300282 A1* | 12/2009 | Rowlands | ........... | G06F 11/1092 711/114 |
| 2010/0174863 A1* | 7/2010 | Cooper | ............. | G06F 17/30575 711/113 |

FOREIGN PATENT DOCUMENTS

| | | |
|---|---|---|
| JP | 09-265435 | 10/1997 |
| JP | 2000-357059 | 12/2000 |
| JP | 2008-269221 | 11/2008 |
| JP | 2009-003789 | 1/2009 |

* cited by examiner

*Primary Examiner* — Joseph Schell
(74) *Attorney, Agent, or Firm* — Staas & Halsey LLP

(57) ABSTRACT

A system includes a plurality of storage devices and an information processing device including a cache memory. The information processing device is configured to access the plurality of storage devices. When a failure has occurred in a first storage device included in the plurality of storage devices, the information processing device perform a procedure including: specifying a second storage device in which no failure has occurred, among the plurality of storage devices, creating an invisible file including a cache that has been stored in the cache memory and is to be stored in the first storage device, and storing the created invisible file in the second storage device. The information processing device stores the cache included in the invisible file stored in the second storage device, in the first storage device when the failure of the first storage device is eliminated.

8 Claims, 12 Drawing Sheets

FIG.10

| NUMBER OF PAGES OF CACHE TO BE SAVED (N) |
| --- |
| LENGTH (NUMBER OF BYTES) OF FIRST PAGE |
| LOCATION (DEVICE NUMBER, BLOCK NUMBER) WHERE FIRST PAGE IS STORED |
| CONTENTS OF FIRST PAGE |
| LENGTH (NUMBER OF BYTES) OF SECOND PAGE |
| LOCATION (DEVICE NUMBER, BLOCK NUMBER) WHERE SECOND PAGE IS STORED |
| CONTENTS OF SECOND PAGE |
| ⋮ |
| LENGTH (NUMBER OF BYTES) OF Nth PAGE |
| LOCATION (DEVICE NUMBER, BLOCK NUMBER) WHERE Nth PAGE IS STORED |
| CONTENTS OF Nth PAGE |

SYSTEM AND METHOD FOR SAVING DATA STORED IN A CACHE MEMORY AS AN INVISIBLE FILE

CROSS-REFERENCE TO RELATED APPLICATION

This application is based upon and claims the benefit of priority from the prior Japanese Patent Application No. 2013-213777 filed on Oct. 11, 2013, the entire contents of which are incorporated herein by reference.

FIELD

The embodiments discussed herein are related to a system and method for saving data stored in a cash memory.

BACKGROUND

The file system of an operating system (OS) uses a cache memory in order to speed up an accessing process to a disk device, such as a hard disk drive (HDD). For example, when data is written, the file system temporarily writes data which is requested to be written to the disk device, in a cache memory. Then, the file system asynchronously (for example, regularly) writes the data written in the cache memory in a disk of the disk device. Hereinafter, data that has been written in the cash memory will be also referred to as a "cash"

However, when an error has occurred in the disk device, the cache on the cache memory is unable to be written in the disk device, causing the cache to be lost. As a technology for coping with the loss of the cache, various technologies including the following technologies are known.

For example, a technology is known in which, when maintenance of the cache memory is performed, the data stored in the cache memory is written into another cache memory or disk device.

A technology is known in which when a single controller malfunctions, a cache data protection controller saves the data stored in the cache memory, in a cache data saving memory.

A technology is known in which when a disk control device receives a notification that power failure is detected from an uninterruptible power supply system, the disk control device stops rotation of a first disk unit and backs up data being stored in the disk cache memory in a second disk unit.

A technology is known in which a write-cache retracting area is formed in a plurality of hard disk drives in addition to a user data area, and contents of the cache memory is written in the write-cache retracting area in the case of power failure.

However, in all the technologies described above, a dedicated hardware resource is provided, separately from a hardware resource of a system which is being operated, in order to save the cache. Therefore, building and operating costs of a system are undesirably increased.

Related techniques are disclosed in, for example, Japanese Laid-Open Patent Publication No. 09-265435, Japanese Laid-Open Patent Publication No. 2008-269221, Japanese Laid-Open Patent Publication No. 2009-003789 and Japanese Laid-Open Patent Publication No. 2000-357059.

SUMMARY

According to one aspect of the present disclosure, there is provided a system including a plurality of storage devices and an information processing device. The information processing device includes a cache memory, and configured to access the plurality of storage devices. When a failure has occurred in a first storage device included in the plurality of storage devices, the information processing device perform a procedure including: specifying a second storage device in which no failure has occurred, among the plurality of storage devices, creating an invisible file including a cache that has been stored in the cash memory and is to be stored in the first storage device, and storing the created invisible file in the second storage device. The information processing device stores the cache included in the invisible file stored in the second storage device, in the first storage device when the failure of the first storage device is eliminated.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of an invisible file, according to an embodiment;

DESCRIPTION OF EMBODIMENTS

First Embodiment

Figure 1:
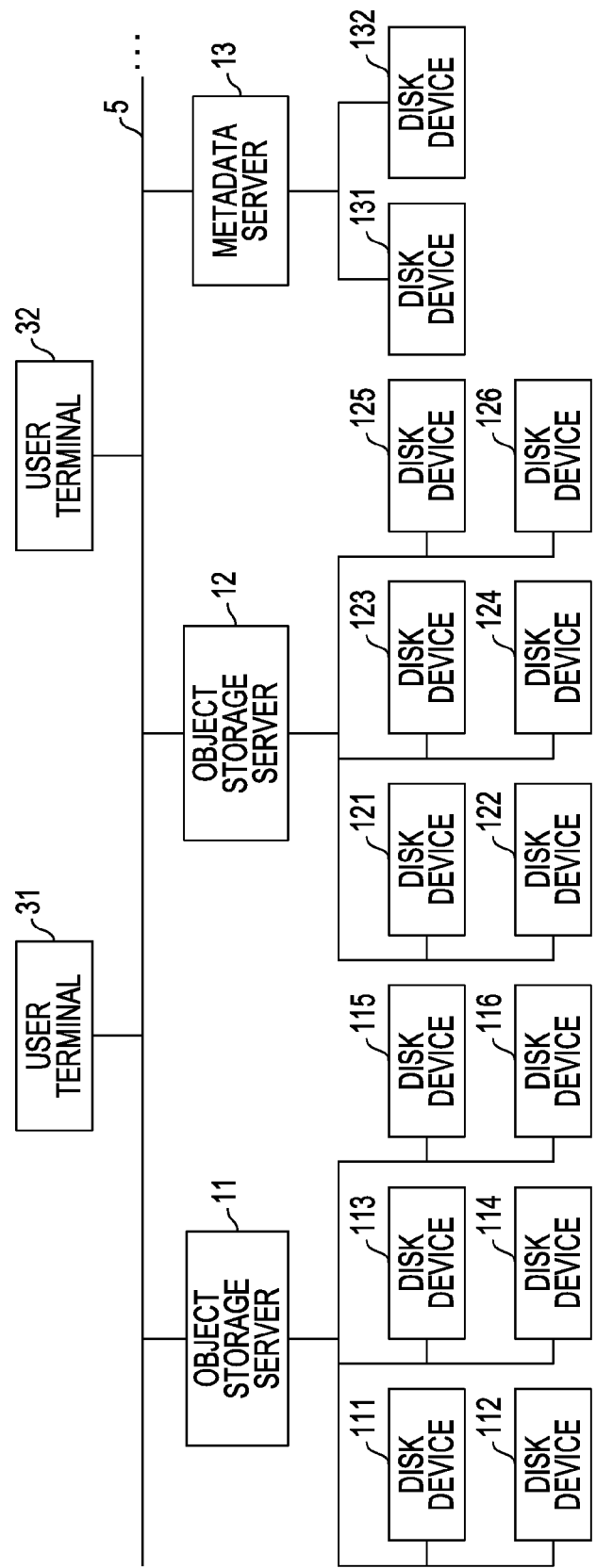
FIG. 1 is a diagram illustrating an example of a configuration of a system, according to an embodiment.

FIG. 1 is a diagram illustrating an example of a configuration of a system, according to an embodiment. In a system illustrated in FIG. 1, object storage servers 11 and 12, a metadata server 13, and user terminals 31 and 32 are connected to a network 5 which is, for example, a local area network (LAN). Disk devices 111 to 116 are connected to the object storage server 11, disk devices 121 to 126 are connected to the object storage server 12, and disk devices 131 and 132 are connected to the metadata server 13.

The metadata server 13 manages the disk devices 131 and 132 in which metadata of a file is stored. The object storage server 11 manages the disk devices 111 to 116 in which data in a substantial part of the file is stored, and the object storage server 12 manages the disk devices 121 to 126 in which data in a substantial part of the file is stored. The object storage servers 11 and 12 receive a result of an executed job from the user terminals 31 and 32 and store the result in the disk devices.

Figure 2:
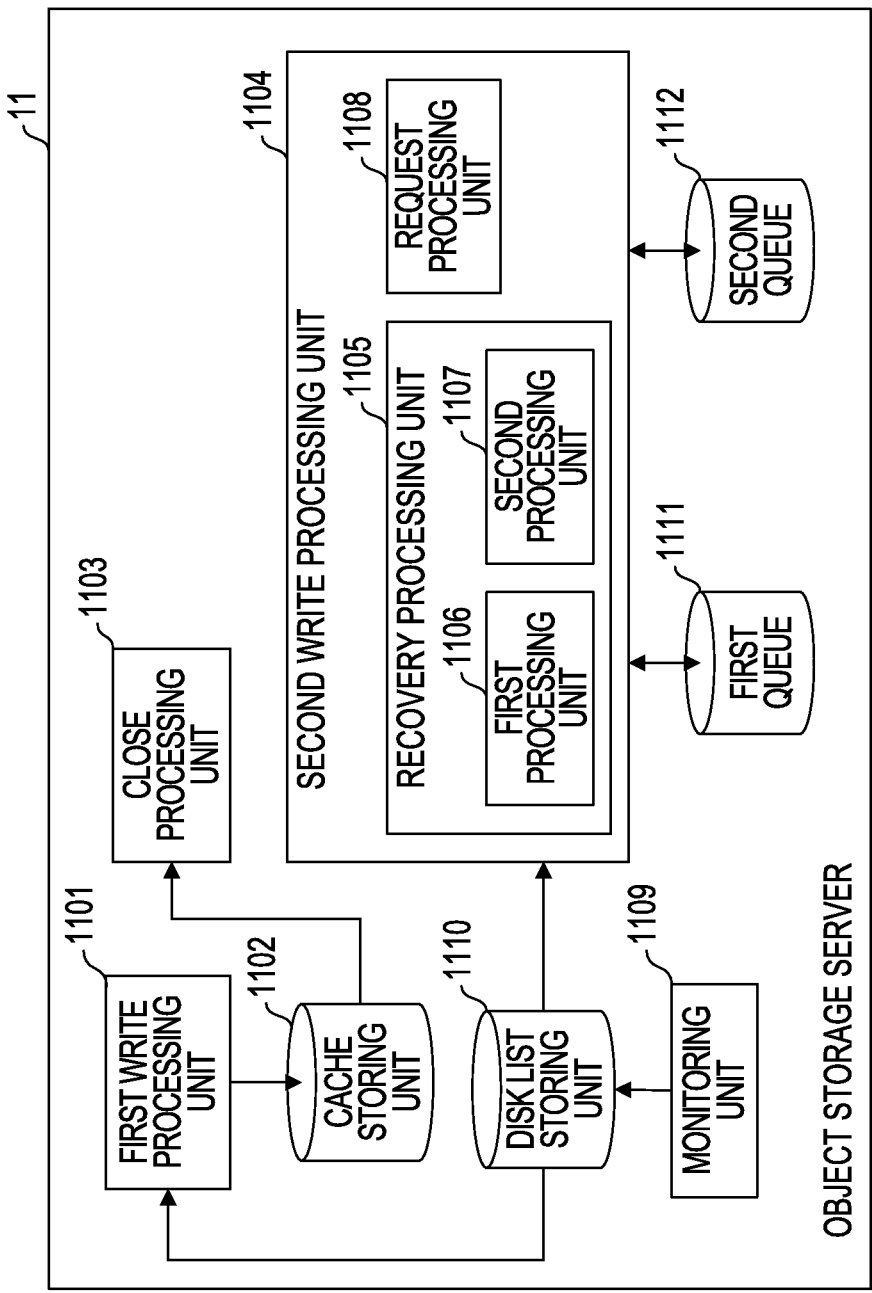
FIG. 2 is a diagram illustrating an example of a functional configuration of an object storage server, according to a first embodiment.

FIG. 2 is a diagram illustrating an example of a functional configuration of an object storage server, according to a first embodiment. The object storage server 11 includes a first write processing unit 1101, a cache storing unit 1102, a close processing unit 1103, a second write processing unit 1104 including a recovery processing unit 1105 and a request processing unit 1108, a monitoring unit 1109, a disk-list storing unit 1110, a first queue 1111, and a second queue 1112. The recovery processing unit 1105 includes a first processing unit 1106 and a second processing unit 1107.

When an instruction to write data is received from a process of a job which is being executed, the first write processing unit 1101 stores the data in the cache storing unit 1102. The cache storing unit 1102 is provided in a cache memory (not illustrated) included in the object storage server 11. Upon receiving a close request for closing the file from the process of a job which is being executed, the close processing unit 1103 transmits a write request for writing the cache, which is stored in the cache storing unit 1102, into a file of the disk device, to the second write processing unit 1104. The request processing unit 1108 performs processing of writing the cache being stored in the cache storing unit 1102 into the disk device. The first processing unit 1106 and the second processing unit 1107 in the recovery processing unit 1105 perform recovery processing which will be described below. The monitoring unit 1109 analyzes a system message which is received from the disk devices 111 to 116, and stores a device number of a failed disk device in which a failure has occurred, in the disk-list storing unit 1110.

A functional block diagram of the object storage server 12 is the same as the functional block diagram of the object storage server 11, and the description thereof will be omitted.

Figure 3:
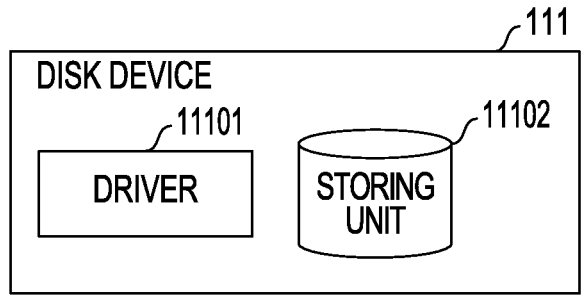
FIG. 3 is a diagram illustrating an example of a functional configuration of a disk device, according to an embodiment.

FIG. 3 is a diagram illustrating an example of a functional configuration of a disk device, according to an embodiment. The disk device 111 includes a driver 11101 and a storing unit 11102. The driver 11101 manages the storing unit 11102. Further, the driver 11101 transmits a system message indicating a state of the disk device 111 to the object storage server 11. The storing unit 11102 is a disk type of a storage medium and a file is stored therein.

Functional block diagrams of disk devices other than the disk device 111 are the same as the functional block diagram of the disk device 111, and the description thereof will be omitted.

Figure 4:
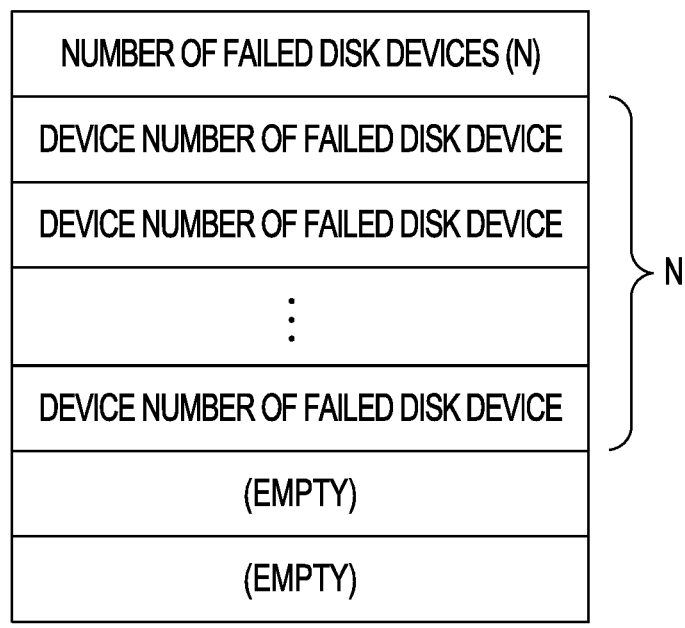
FIG. 4 is a diagram illustrates an example of data which is stored in a disk-list storing unit, according to an embodiment.

FIG. 4 is a diagram illustrates an example of data which is stored in a disk-list storing unit, according to an embodiment. In an example of FIG. 4, information indicating the number of disk devices in which a failure has occurred and a device number of the disk device in which a failure has occurred are stored in the disk-list storing unit 1110.

Figure 5:
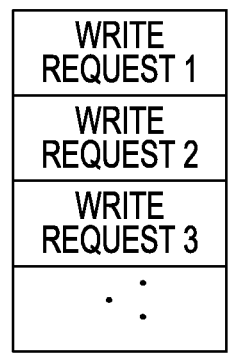
FIG. 5 is a diagram illustrating an example of data which is stored in a first queue, according to an embodiment.

FIG. 5 is a diagram illustrating an example of data which is stored in a first queue, according to an embodiment. In an example of FIG. 5, the write request which is received from the close processing unit 1103 is stored in the first queue 1111. The request processing unit 1108 processes the write request stored in the first queue 1111 by a first in first out (FIFO) scheme. The write request stored in the first queue 1111 is regularly processed.

A data structure of the second queue 1112 is the same as a data structure of the first queue 1111. The write request stored in the second queue 1112 is not processed but moved to the first queue and then processed. The detail on this will be described below.

Next, processing which is performed by the object storage server 11 will be described with reference to FIGS. 6 to 10. First, the processing of the first write processing unit 1101 which stores data in the cache storing unit 1102 will be described with reference to FIG. 6.

Figure 6:
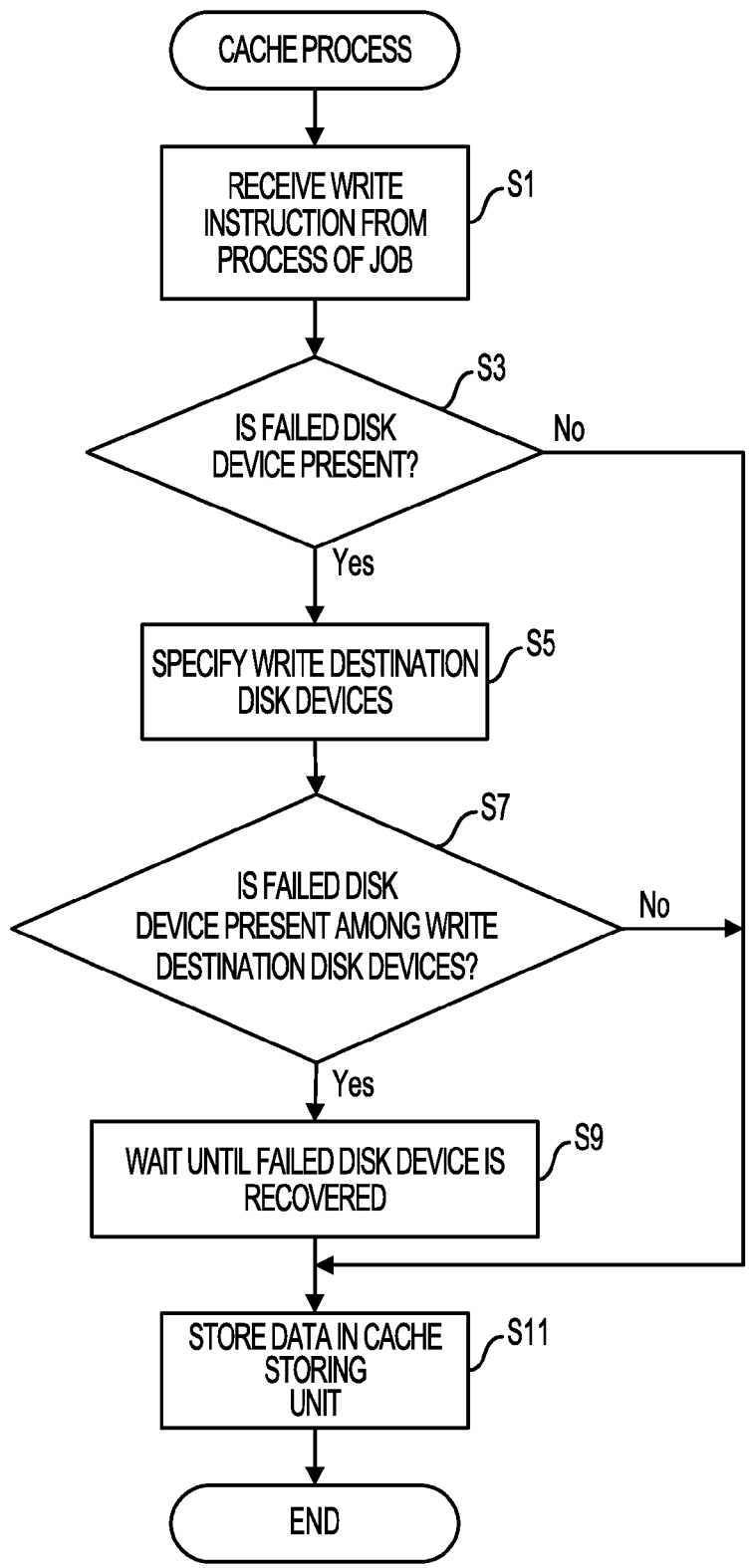
FIG. 6 is a diagram illustrating en example of an operational flowchart for a cache process, according to an embodiment.

First, the first write processing unit 1101 receives an instruction for writing data in a file from a process of a job which is being executed in the object storage server 11 (step S1 of FIG. 6).

The first write processing unit 1101 determines whether there is a failed disk device, or a disk device in which a failure has occurred, depending on whether the device number of the disk device is registered in the disk-list storing unit 1110 (step S3).

When there is no disk device in which a failure has occurred ("NO" at step S3), there is no problem with storing data in the cache storing unit 1102 at the present time, and the process goes to step S11. In contrast, when there is a failed disk device ("YES" at step S3), the first write processing unit 1101 specifies a disk device which is a write destination of the data, based on information, such as a file in which the data is written, an offset from a top of the file, and data quantity (step S5). In order to reduce influence on the processing performance, the disk device which is the write destination is specified only when a failure has occurred.

The first write processing unit 1101 determines whether there is a failed disk device, among the disk devices which are write destinations (write-destination disk devices), using the device numbers of disk devices which are stored in the disk-list storing unit 1110 (step S7).

When there is no failed disk device among the disk devices which are the write destinations ("NO" at step S7), there is no problem with storing data in the cache storing unit 1102 at the present time, and the processing at step S11 is performed. In the meantime, when there is a failed disk device, among the disk devices which are the write destinations ("YES" at step S7), the first write processing unit 1101 waits until the failed disk device is recovered (step S9). When the failed disk device is recovered by a job of a manager, the manager notifies the recovery to the file system of the object storage server 11 by a command, and the process goes to step S11.

The first write processing unit 1101 stores data which is instructed to be written, in the cache storing unit 1102 (step S11), and ends the processing.

When the processing as described above is performed, the shortage of the capacity of the cache storing unit 1102 due to the increased data which waits to be stored in the storing unit of the disk device may be prevented.

Next, processing which is performed when the close processing unit 1103 closes the file will be described with reference to FIG. 7.

Figure 7:
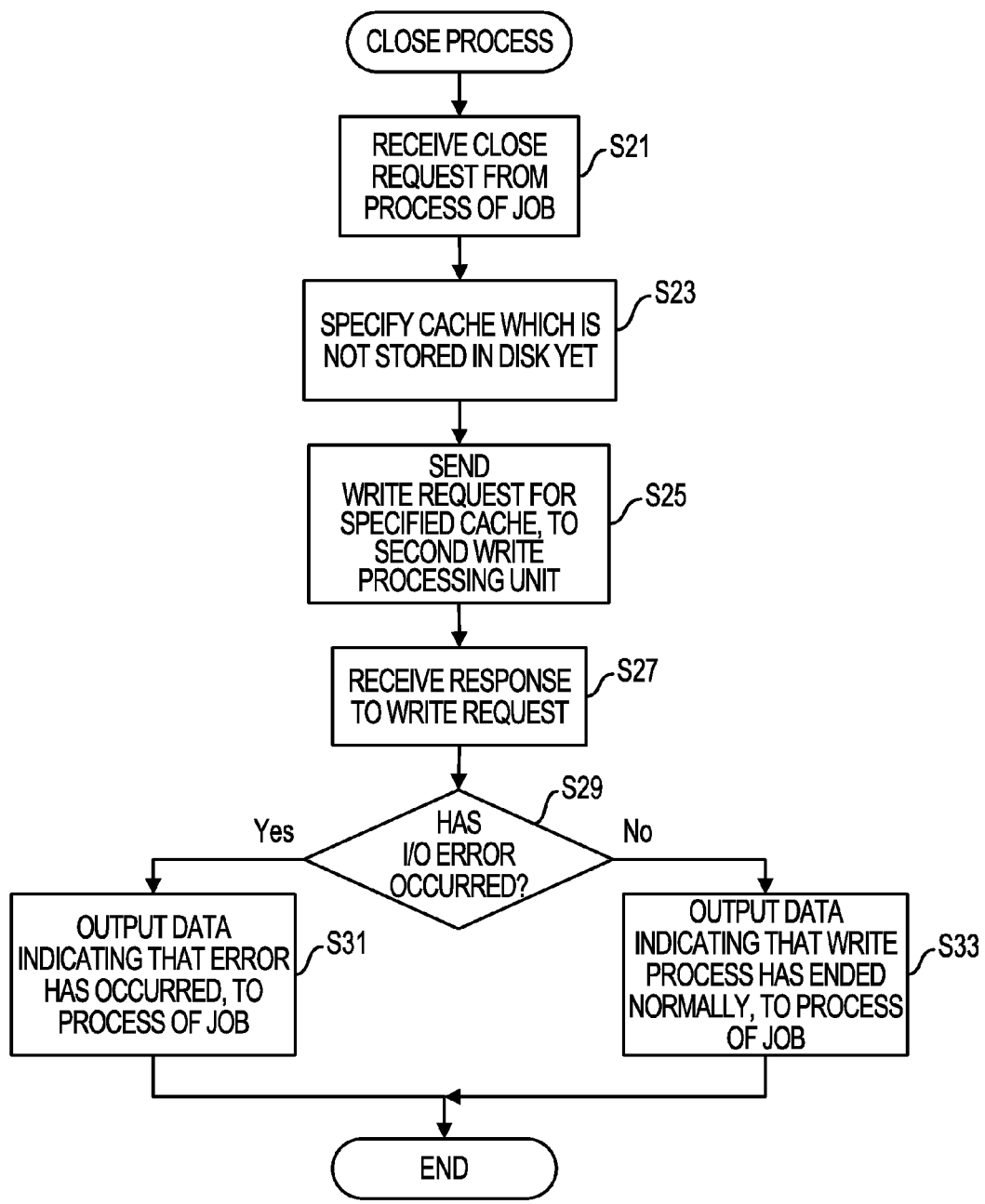
FIG. 7 is a diagram illustrating en example of an operational flowchart for a close process, according to an embodiment.

First, the close processing unit 1103 receives a close request which requests to close the file from the process of the job which is being executed in the object storage server 11 (step S21 of FIG. 7).

The close processing unit 1103 specifies a cache (all caches which are stored in the cache storing unit 1102 in this exemplary embodiment) which is not stored in the storing unit of the disk device yet from the cache storing unit 1102 (step S23).

The close processing unit 1103 transmits a write request for writing the cache specified at step S23, to the second write processing unit 1104 (step S25). Upon receiving the write request, the second write processing unit 1104 performs write processing. In the write processing, the second write processing unit 1104 outputs a response including information indicating whether there is an input/output (I/O) error, to the close processing unit 1103. The write processing will be described in detail below.

The close processing unit 1103 receives the response responsive to the write request, from the second write processing unit 1104 (step S27).

The close processing unit 1103 determines whether the I/O error has occurred, based on information, included in the received response, indicating whether there is an I/O error (step S29).

When the I/O error has occurred ("YES" at step S29), the close processing unit 1103 outputs data indicating that the error has occurred, to the process of a job which is being executed (step S31). In contrast, when the I/O error has not occurred ("NO" at step S29), the close processing unit 1103 outputs data indicating that the close processing has normally ended, to the process of a job which is being executed (step S33), and ends the processing.

By performing the processing as described above, the caches which remain in the cache storing unit 1102 may be written in the storing unit of the disk device without any omission when the file is closed.

Next, write processing which is performed by the second write processing unit 1104 will be described with reference to FIG. 8.

Figure 8:
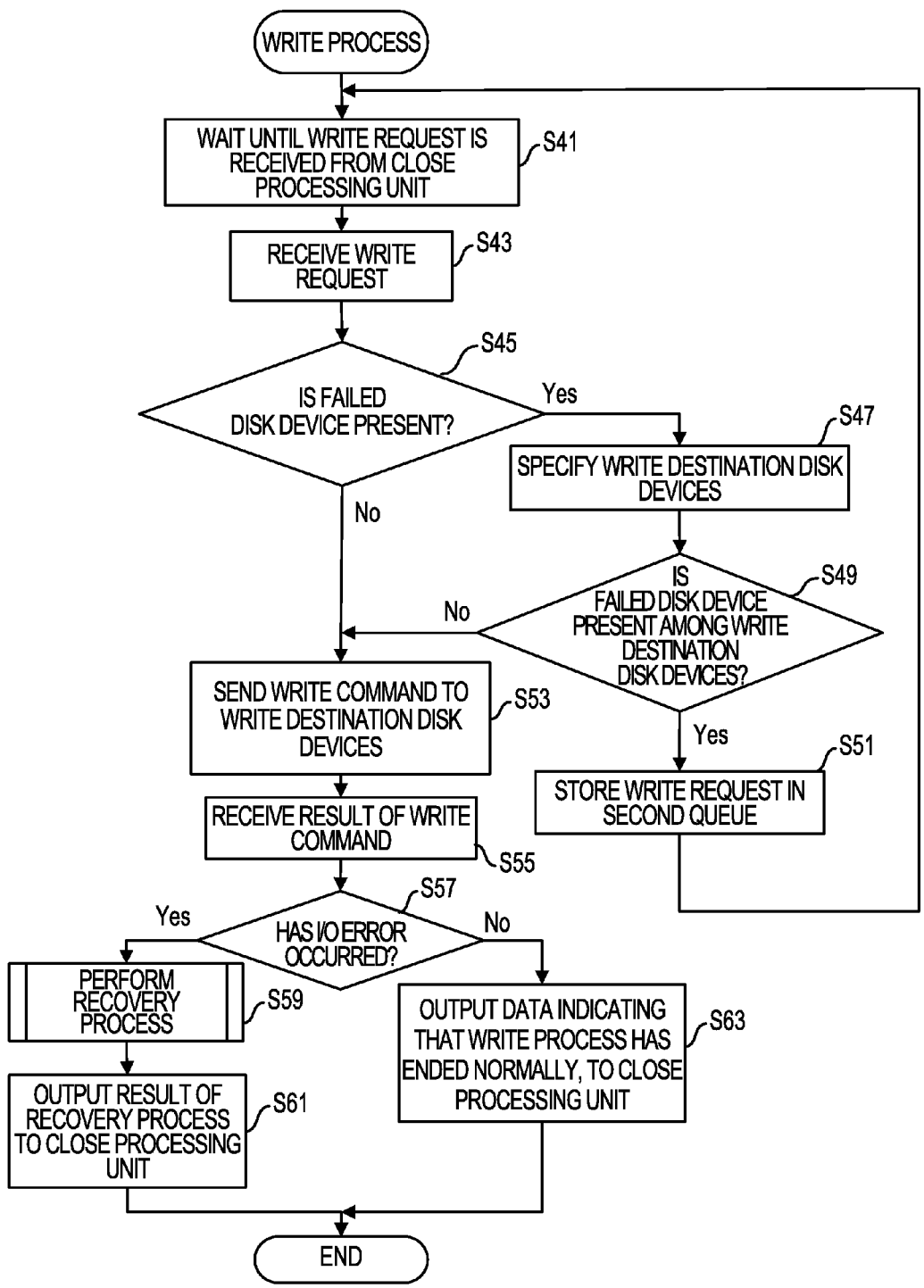
FIG. 8 is a diagram illustrating en example of an operational flowchart for a write process, according to an embodiment.

First, the request processing unit 1108 in the second write processing unit 1104 waits until a write request is received from the close processing unit 1103 (step S41 of FIG. 8). The request processing unit 1108 receives the write request from the close processing unit 1103 (step S43).

The request processing unit 1108 determines whether there is a failed disk device, depending on whether the device number of the disk device is registered in the disk-list storing unit 1110 (step S45).

When there is a failed disk device ("YES" at step S45), the request processing unit 1108 specifies disk devices which are write destinations of the data, based on information, such as a file in which the data is written, an offset from a top of the file, and data quantity (step S47).

The request processing unit 1108 determines whether there is a failed disk device among the disk devices which are write destinations, using the device numbers of the disk devices which are stored in the disk-list storing unit 1110 (step S49).

When there is no failed disk device among the disk devices which are the write destinations ("NO" at step S49), there is no problem with storing the cache in the storing unit of the disk device at the present time, and the process goes to step S53. In the meantime, when there is a failed disk device among the disk devices which are the write destinations ("YES" at step S49), since the cache is unable to be stored in the storing unit of the disk device at the present time, the request processing unit 1108 stores the write request in the second queue 1112 (step S51), and the process goes back to step S41.

In the meantime, when there is no failed disk device ("NO" at step S45), the request processing unit 1108 transmits a write command for writing the cache, to a disk device which is the write destination (step S53). Upon receiving the write command from the object storage server 11, the disk device writes the cache which is included in the write command in a file which is stored in the storing unit and closes the file. Further, the disk device transmits a result of the write command to the object storage server 11. The result of the write command includes information indicating whether there is an I/O error.

The request processing unit 1108 receives the result of the write command from the disk device which is the transmitting destination of the write command (step S55).

The request processing unit 1108 determines whether the I/O error has occurred, based on information indicating whether there is an I/O error, which is included in the received result of the write command (step S57).

When an I/O error has occurred ("YES" at step S57), the recovery processing unit 1105 in the second write processing unit 1104 performs a recovery processing at step S59. The recovery processing will be described with reference to FIGS. 9 and 10.

Figure 9:
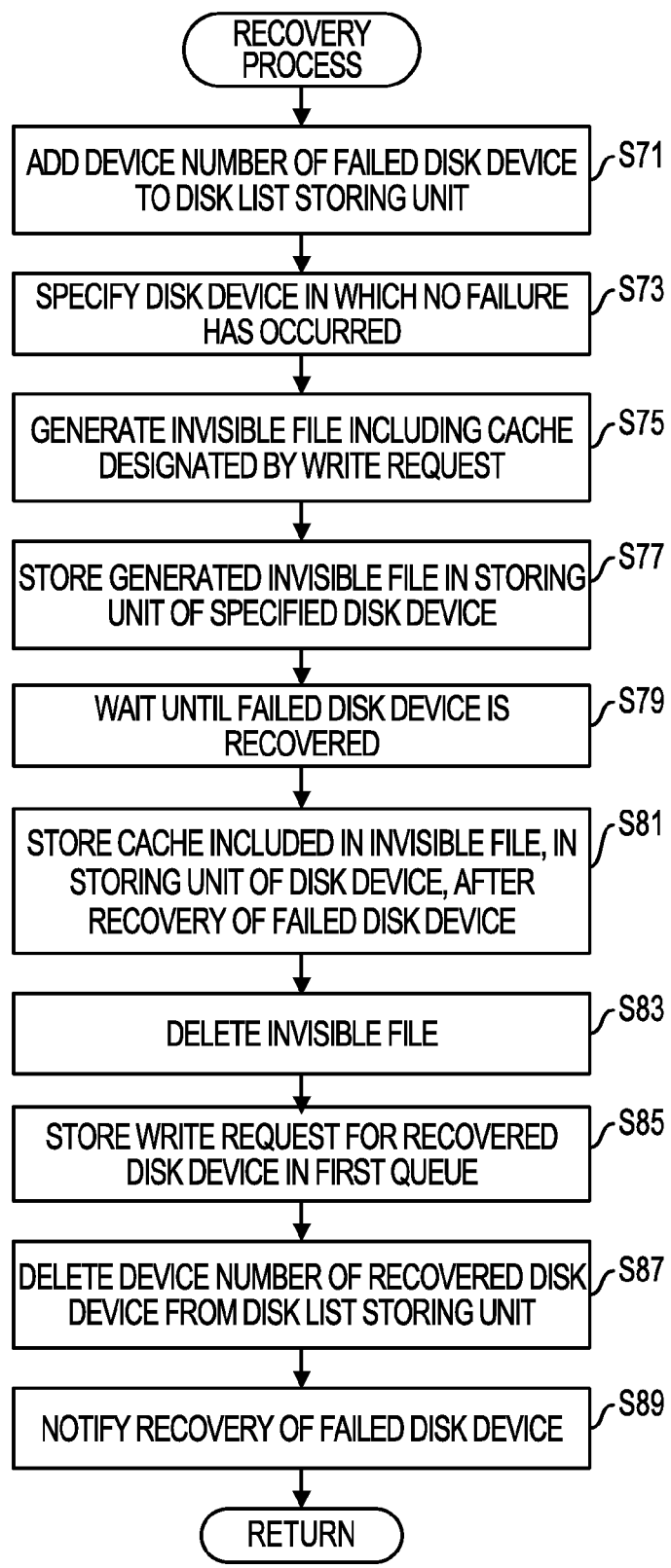
FIG. 9 is a diagram illustrating en example of an operational flowchart for a recovery process, according to an embodiment.

First, the first processing unit 1106 in the recovery processing unit 1105 adds the device number of the failed disk device into the disk-list storing unit 1110 (step S71 of FIG. 9). Further, the first processing unit 1106 increments the number of the failed disk devices by one in the disk-list storing unit 1110.

The first processing unit 1106 specifies a disk device in which no failure has occurred (step S73). The disk device in which no failure has occurred is a disk device whose device number is not registered in the disk-list storing unit 1110.

The first processing unit 1106 generates an invisible file which includes a cache designated in the write request (step S75). FIG. 10 is a diagram illustrating an example of an invisible file, according to an embodiment. In the example of FIG. 10, the invisible file includes the number of pages of a cache to be saved and information on each page. The information on a page includes a length (that is, the number of bytes) of the page, a location (a device number and a block number of the disk device in this exemplary embodiment) where the page is stored, and contents of the page. The invisible file is set so as not to be referred to by a user of the system.

The first processing unit 1106 stores the invisible file which is generated at step S75 in a storing unit of the disk device specified in step S73 (step S77). At step S77, the first processing unit 1106 transmits the generated invisible file for saving data to the disk device so as to store the invisible file in the disk device.

In general, the file system manages a block usage in the disk device and uses the block in a state where the disk device has a sufficient empty area. Therefore, the file system may easily obtain and use the empty area from a disk device in which no failure has occurred.

The first processing unit 1106 waits until the failed disk device is recovered (step S79). When the failed disk device is recovered by the operation of a manager, the manager notifies the recovery to the file system of the object storage server 11 by a command. Upon receiving the notification, the first processing unit 1106 instructs the second processing unit 1107 to perform the processing in accordance with the notification.

After the recovery of the failed disk device, the second processing unit 1107 extracts a cache from the invisible file for saving data, and stores the cache in a disk device in which the cache needs to be stored (step S81). At step S81, the second processing unit 1107 sends the cache to the disk device to store the cache in the disk device. Further, the second processing unit 1107 deletes the invisible file for saving data (step S83).

The second processing unit 1107 extracts write requests relevant to the recovered disk device from the second queue 1112 and adds the write requests to the first queue 1111 (step S85), thereby allowing the write requests which have been issued during the failure to be processed. Further, the second processing unit 1107 deletes the device number of the recovered disk device from the disk-list storing unit 1110 (step S87).

The second processing unit 1107 notifies that the failed disk device is recovered to the request processing unit 1108 (step S89), and ends the processing.

Referring back to the description of FIG. 8, the request processing unit 1108 outputs a result of the recovery processing to the close processing unit 1103 (step S61).

Meanwhile, when the I/O error has not occurred ("NO" at step S57), the request processing unit 1108 outputs data indicating that the write processing has normally ended, to the close processing unit 1103 (step S63), and ends the processing.

As described above, since the invisible file is not referred to by a user, there is no problem in storing the invisible file in the disk device in a system being operated. Therefore, there is no need to provide a dedicated storage device in order to save the cache, thereby allowing the cache to be efficiently saved without increasing the cost.

The second write processing unit 1104 may be configured to not only write the cache in the storing unit of the disk device by the write processing but also regularly process the write request in the first queue 1111 to write the cache in the storing unit of the disk device. This allows the accumulation of caches in the cache storing unit 1102 to be suppressed.

Even though processing performed by the object storage server 11 has been described above, processing performed by the object storage server 12 is the same as the processing which is performed by the object storage server 11.

Second Embodiment

Figure 11:
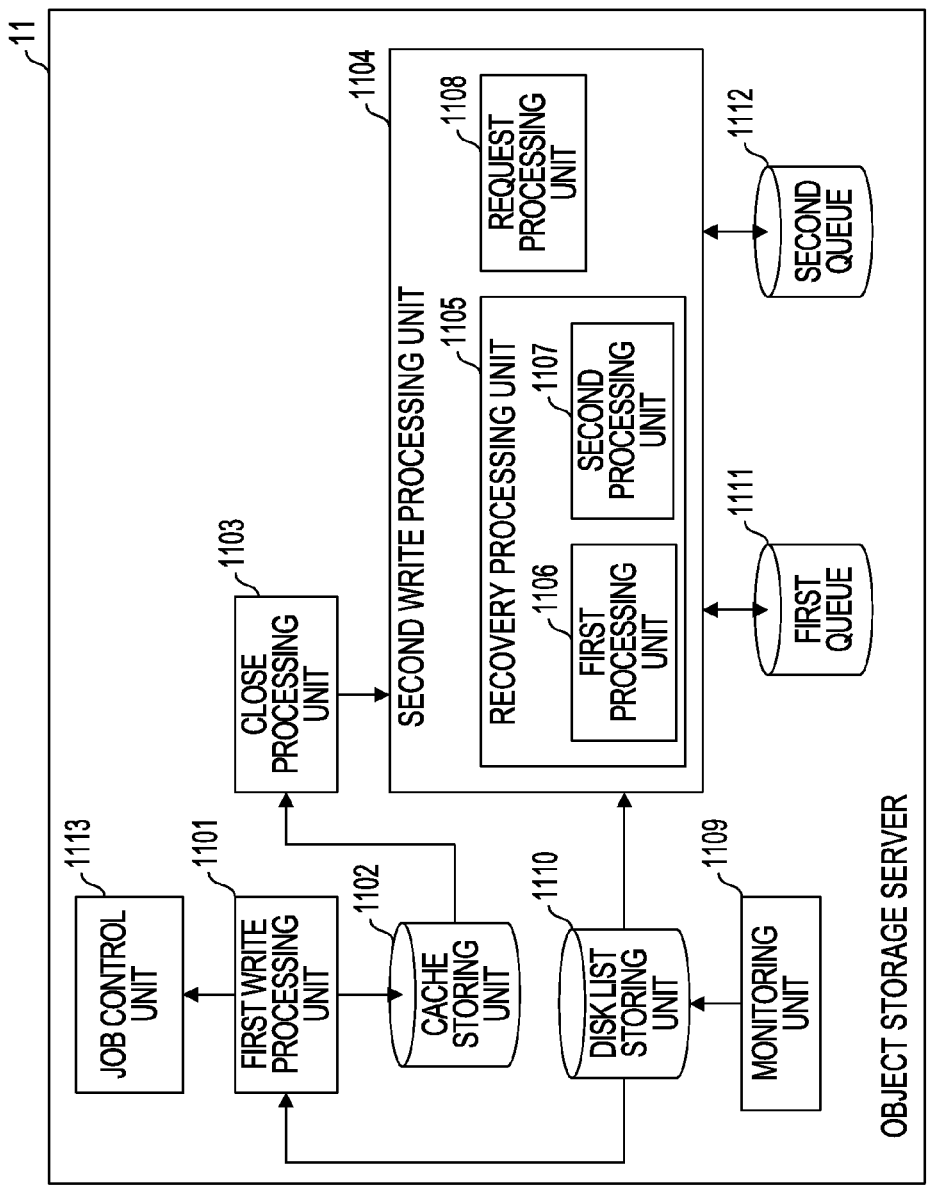
FIG. 11 is a diagram illustrating an example of a functional configuration of an object storage server, according to an embodiment.

Next, a second embodiment will be described. FIG. 11 is a diagram illustrating an example of a functional configuration of an object storage server, according to a second embodiment. As compared with the object storage server 11 according to the first embodiment, the object storage server 11 according to the second embodiment includes a job control unit 1113. The job control unit 1113 stops a process which has issued a write instruction or a job in which the process is being executed, in accordance with a request from a first write processing unit 1101.

Next, processing of the first write processing unit 1101 which stores data in a cache storing unit 1102 will be described with reference to FIG. 12.

Figure 12:
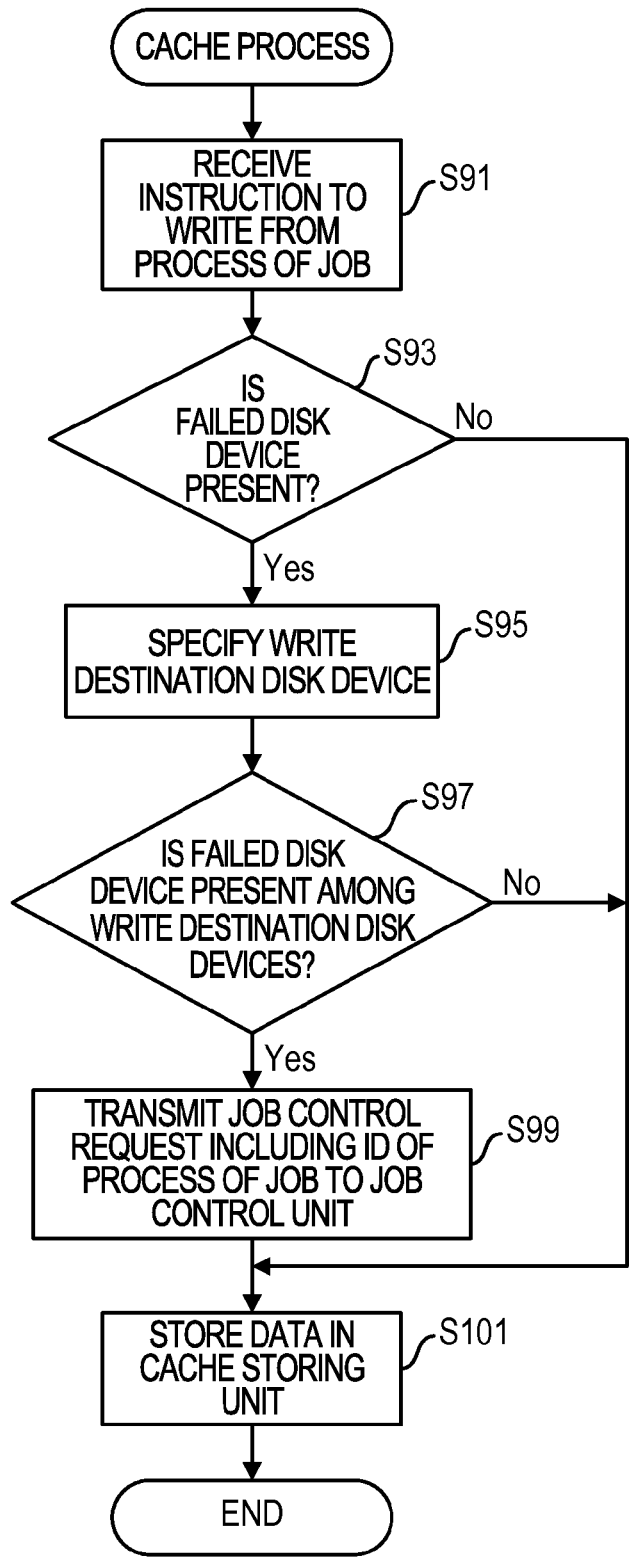
FIG. 12 a diagram illustrating en example of an operational flowchart for a cache process, according to an embodiment.

First, the first write processing unit 1101 receives an instruction to write data in a file, from a process of a job being executed in the object storage server 11 (step S91 of FIG. 12).

The first write processing unit 1101 determines whether there is a failed disk device, or a disk device in which a failure has occurred, depending on whether the device number of the disk device is registered in a disk-list storing unit 1110 (step S93).

When there is no failed disk device ("NO" at step S93), there is no problem with storing data in the cache storing unit 1102 at the present time, and processing in step S101 is performed. In contrast, when there is a failed disk device ("YES" at step S93), the first write processing unit 1101 specifies disk devices which are write destinations of the data, based on information, such as a file in which the data is written, an offset from a top of the file, and data quantity (step S95).

The first write processing unit 1101 determines whether there is a failed disk device among the disk devices which are write destinations, based on the device numbers of the disk devices which are stored in the disk-list storing unit 1110 (step S97).

When there is no failed disk device among the disk devices which are the write destinations ("NO" at step S97), there is no problem with storing data in the cache storing unit 1102 at the present time, and the process goes to step S101. Meanwhile, when there is a failed disk device among the disk devices which are the write destinations ("YES" at step S97), the first write processing unit 1101 sends a job control request including an ID of a process which has issued the write instruction, to the job control unit 1113 (step S99). Here, the ID of the process which has issued the write instruction is specified by information included in the write instruction.

The first write processing unit 1101 stores data which is instructed to be written in the cache storing unit 1102 (step S11) and ends the processing.

Performing the processing described above allows the job control unit 1113 to be notified of a process to be stopped or a job in which the process is performed.

Figure 13:
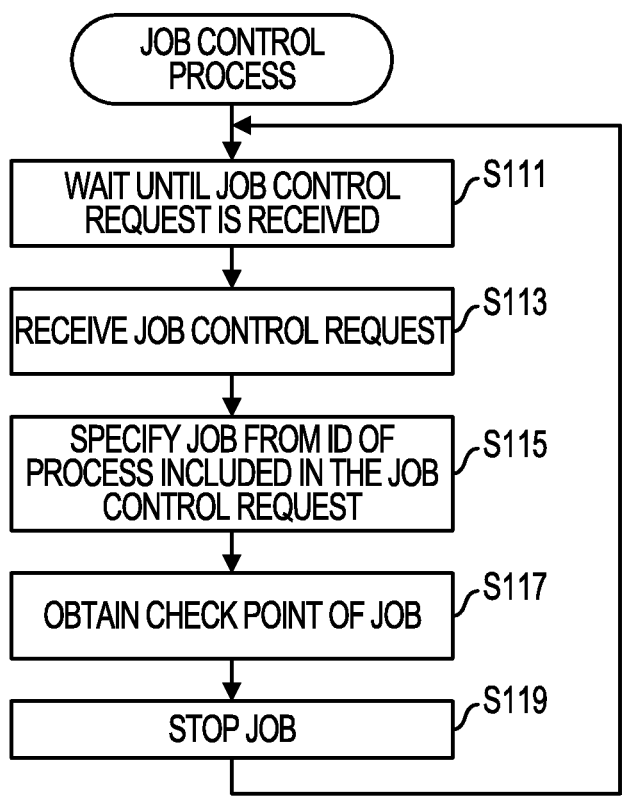
FIG. 13 is a diagram illustrating en example of an operational flowchart for a job control process, according to an embodiment.

Next, processing performed by the job control unit 1113 will be described with reference to FIG. 13. First, the job control unit 1113 waits until the job control request is received (step S111 of FIG. 13) and receives the job control request (step S113).

The job control unit 1113 specifies the job in which the process is performed from the ID of the process included in the job control request (step S115).

The job control unit 1113 obtains a check point including data indicating a state of a job being executed (step S117), and stores the check point in a storage device in the object storage server 11 or a storage device which is managed by another server connected to a network 5.

The job control unit 1113 stops the job specified at step S115 (step S119), and returns to the original processing. This allows resources, such as a memory which is used in the job, are released. In this case, the job is stopped at step S119, but it is also possible to stop only the process.

When the processing as described above is performed, the job is stopped, thereby preventing the shortage of the capacity of the cache storing unit 1102 due to the increased data which waits to be stored in the storing unit of the disk device. In the meantime, the check point is used to resume the job by recovering the state of the job being executed.

The embodiments of the present disclosure have been described above, but the present disclosure is not limited thereto. For example, the functional configurations of the object storage server 11 and the disk device 111 may not match an actual program module configuration in some cases.

A configuration of each table described above is an example but the configuration as described above may not be essential. Further, in the process flow, if the processing result is not changed, a processing sequence of the process may be changed. Further, the processes may be performed in parallel.

In the above example, the first queue and the second queue are used, but only one queue may be used. For example, when only the first queue is used, at step S51, information indicating that the write request is not immediately processed may be stored in the first queue in association with the write request. Further, at step S85, by deleting the associated information, the same result as the above-described processing is obtained.

The system illustrated in FIG. 1 has a type of lustre file system, but may be a distributed file system other than the lustre file system.

In the example described above, disk devices are installed outside the server, but the processing according to the embodiment may be performed on the disks of the server.

Figure 14:
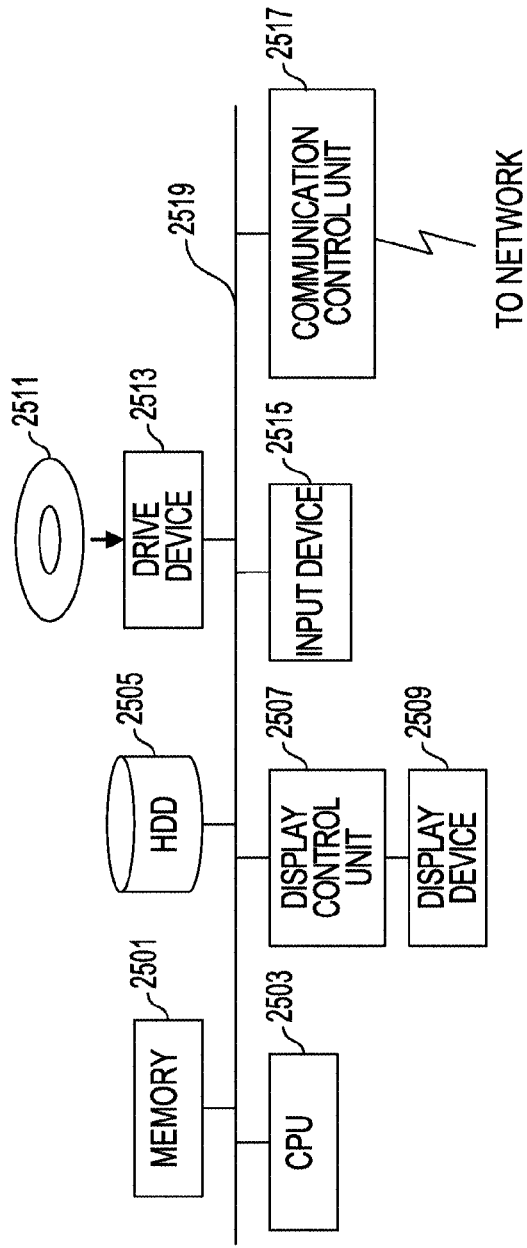
FIG. 14 is a diagram illustrating an example of a configuration of a computer, according to an embodiment.

The object storage servers 11 and 12, the metadata server 13 and the user terminals 31 and 32 which are described above may be computer devices, and as illustrated in FIG. 14, a memory 2501, a central processing unit (CPU) 2503, a hard disk driver (HDD) 2505, and a display control unit 2507 which is connected to a display device 2509, a drive device 2513 for a removable disk 2511, an input device 2515, and a communication control unit 2517 for being connected to the network are connected to each other via a bus 2519. An operating system (OS) and application programs which perform the processing of the embodiment are stored in the HDD 2505, and are read out from the HDD 2505 to the memory 2501 when the OS and the application programs are executed by the CPU 2503. The CPU 2503 controls the display control unit 2507, the communication control unit 2517, and the drive device 2513 in accordance with the processing contents of the application programs so as to perform predetermined operations. Further, data being processed is mainly stored in the memory 2501, but may be stored in the HDD 2505. In the exemplary embodiment of the present disclosure, the application programs which perform the above-described processing are stored in the computer readable removable disk 2511 to be distributed and installed from the drive device 2513 into the HDD 2505. The application programs may be installed in the HDD 2505 via a network, such as Internet, and the communication control unit 2517. Such a computer device implements various functions as described above, by causing hardware described above, such as the CPU 2503 and the memory 2501, and programs, such as the OS and the application programs, to intimately cooperate with each other.

The embodiments of the present disclosure described above will be summarized as follows.

An information processing system according to a first aspect of the exemplary embodiment includes (A) a plurality of storage devices; and (B) an information processing device which is able to access the plurality of storage devices and includes a cache memory. Further, the above-described information processing device includes (b1) a first processing unit which, when a failure has occurred in a first storage device among the plurality of storage devices, specifies a second storage device in which no failure has occurred among the plurality of storage devices, creates an invisible file including a cache that is being stored in the cache memory and to be stored in the first storage device, and stores the invisible file in the second storage device; and (b2) a second processing unit which, when the failure of the first storage device is eliminated, stores the cache included in the invisible file, which is stored in the second storage device, in the first storage device.

According to the configuration described above, even when the second storage device is not a specific storage device for saving data, a situation where a user, who is not allowed inherently to refer to the cache, refers to the cache does not occur. Accordingly, since it is unnecessary to install a separate storage device for saving data, a cost required to save the cache may be reduced.

The above-described information processing device may further include (b3) a third processing unit which preserves a process which stores data in the first storage device or information which is used to resume a job in which the process is performed and ends the process or the job. By doing this, the shortage of a capacity of the cache memory due to the increased data which waits to be stored in the first storage device may be prevented.

The above-described information processing device may further include (b4) a fourth processing unit which stops the process which stores the data to be stored in the first storage device in the cache memory until the failure of the first storage device is eliminated. By doing this, the shortage of a capacity of the cache memory due to the increased data which waits to be stored in the first storage device may be prevented.

The above-described information processing device may further include (b5) a fifth processing unit which adds a first storing request in a queue so that the first storing request for storing the cache in the cache memory in the first storage device is processed after the failure of the first storage device is eliminated. As a result, a process which stores the cache in a failed storage device may not be performed.

The above-described second processing unit may (b21) delete the invisible file stored in the second storage device. As a result, the capacity of the storage device may not be reduced due to the unnecessary invisible file.

The above-described queue may include a first queue in which a storing request to be processed is stored and a second queue in which a storing request whose processing is to be suspended is stored. Further, the above-described fourth processing unit (b41) may store the first storing request in the second queue and the above-described second processing unit (b22) may extract the first storing request from the second queue when the failure of the first storage device is eliminated, and store the first storing request in the first queue. In the meantime, a queuing method is not limited to the above method.

A control method according to a second aspect of the exemplary embodiment is executed in an information processing system including a plurality of storage devices and an information processing device which may access the plurality of storage devices and includes a cache memory. Further, the above-described information processing device executes the processing, including: (C) specifying, when a failure has occurred in a first storage device among the plurality of storage devices, a second storage device in which no failure has occurred, among the plurality of storage devices; (D) creating an invisible file including a cache that is being stored in the cash memory and to be stored in the first storage device and storing the invisible file in the second storage device; and (E) storing the cache included in the invisible file, which is stored in the second storage device, in the first storage device when the failure of the first storage device is eliminated.

A program which causes a computer to execute the processing by the above method may be created and the program is stored in a computer readable storing medium such as a flexible disk, a CD-ROM, an optical magnetic disk, a semiconductor memory, or a hard disk or a storage device. Further, an intermediate processing result is temporarily stored in a storage device such as a main memory.

Following claims with respect to the exemplary embodiments including the examples as described above will be disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   a plurality of storage devices; and
   an information processing device including a cache memory and at least one processor configured to access the plurality of storage devices, wherein
   the at least one processor is configured to:
   when a failure has occurred in a first storage device included in the plurality of storage devices, perform a procedure including:
   specifying a second storage device in which no failure has occurred, among the plurality of storage devices,
   creating an invisible file including a cache that has been stored in the cache memory and is to be stored in the first storage device, and
   storing the created invisible file in the second storage device; and
   store the cache included in the invisible file stored in the second storage device, in the first storage device when the failure of the first storage device is eliminated.

2. The system of claim 1, wherein
   the at least one processor is further configured to end a process that stores data in the first storage device or a job in which the process is performed, after preserving the process or information used to resume the job.

3. The system of claim 1, wherein
   the at least one processor is further configured to pause a process that stores, in the cache memory, data to be stored in the first storage device, until the failure of the first storage device is eliminated.

4. The system of claim 1, wherein
   the at least one processor is further configured to add, in a queue, a first storing request for storing the cache being stored in the cache memory in the first storage device so that the first storing request is processed after the failure of the first storage device is eliminated.

5. The system of claim 1, wherein
   the at least one processor is further configured to delete the invisible file stored in the second storage device.

6. The system of claim 4, wherein
   the queue is configured to include a first queue in which a storing request to be processed is stored and a second queue in which a storing request whose processing is to be suspended is stored; and
   the at least one processor is configured to:
   store the first storing request in the second queue, and
   when the failure of the first storage device is eliminated, extract the first storing request from the second queue and store the extracted first storing request in the first queue.

7. A method for controlling a system including a plurality of storage devices and an information processing device, the information processing device including a cache memory and at least one processor configured to access the plurality of storage devices, the method causing the at least one processor to execute a control process comprising:
   when a failure has occurred in a first storage device included in the plurality of storage devices, performing a procedure including:
   specifying a second storage device in which no failure has occurred, among the plurality of storage devices,
   creating an invisible file including a cache that has been stored in the cash memory and is to be stored in the first storage device, and
   storing the created invisible file in the second storage device; and
   when the failure of the first storage device is eliminated, storing the cache included in the invisible file stored in the second storage device, in the first storage device.

8. A non-transitory, computer-readable recording medium having stored therein a program for causing a computer included in an information processing device to perform a control process comprising:
   when a failure has occurred in a first storage device included in the plurality of storage devices, performing a procedure including:
   specifying a second storage device in which no failure has occurred, among the plurality of storage devices,
   creating an invisible file including a cache that has been stored in the cache memory and is to be stored in the first storage device, and
   storing the created invisible file in the second storage device; and
   when the failure of the first storage device is eliminated, storing the cache included in the invisible file stored in the second storage device, in the first storage device.

* * * * *